United States Patent
Grigsby et al.

(10) Patent No.: US 9,453,736 B2
(45) Date of Patent: *Sep. 27, 2016

(54) PREVENTATIVE TRAFFIC CONGESTION SOCIAL NETWORKING IMPROVEMENT SYSTEM WITHIN A COMMUNITY

(71) Applicant: International Business Machines Corporation, Armonk, NY (US)

(72) Inventors: Travis M. Grigsby, Austin, TX (US); Frank L. Jania, Chapel Hill, NC (US); Lisa Seacat Deluca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/210,112

(22) Filed: Mar. 13, 2014

(65) Prior Publication Data

US 2014/0195146 A1 Jul. 10, 2014

Related U.S. Application Data

(63) Continuation of application No. 12/131,762, filed on Jun. 2, 2008, now Pat. No. 8,712,675.

(51) Int. Cl.
*G01C 21/30* (2006.01)
*G01C 21/28* (2006.01)
(Continued)

(52) U.S. Cl.
CPC ........... *G01C 21/28* (2013.01); *G01C 21/3484* (2013.01); *G01C 21/3492* (2013.01); *G08G 1/096822* (2013.01)

(58) Field of Classification Search
CPC .......... G01C 21/3492; G01C 21/3453; G08G 1/096822; H04W 36/32; H04W 4/04; H04W 76/04

USPC ....... 701/117, 118, 400, 408, 410, 412, 414, 701/421; 340/995.23, 995.13, 988; 342/350, 357.06, 357.2, 357.21, 342/357.22
See application file for complete search history.

(56) References Cited

U.S. PATENT DOCUMENTS 5,928,307 A * 7/1999 Oshizawa et al. ............ 701/411
6,317,685 B1 11/2001 Kozak et al.
(Continued)

OTHER PUBLICATIONS

U.S. Appl. No. 12/131,762 entitled "Preventative Traffic Congestion Social Networking Improvement System Within a Community"; Non-final office action dated Sep. 28, 2011.
(Continued)

*Primary Examiner* — Dalena Tran
(74) *Attorney, Agent, or Firm* — Eustace P. Isidore; Yudell Isidore PLLC

(57) ABSTRACT

A method, system, and computer program product for transmitting traffic congestion routing data to a community of global positioning system (GPS) devices. Community routing logic of a community routing system (CRS) receives a route request containing the current location and desired destination of a GPS device. The CRS may use the community routing logic to determine a path that the user of the GPS device should travel on to best minimize driving time and traffic conditions for a community of users of the CRS. The CRS considers road capacity, current traffic conditions, and historical traffic data for roads and alternate roads along a preferred route. The CRS also considers routes previously taken by the GPS device. Additionally, the CRS may receive information about routes taken by other GPS devices to further improve future routes of the community of GPS devices.

19 Claims, 3 Drawing Sheets

(51) Int. Cl.
*G01C 21/34* (2006.01)
*G08G 1/0968* (2006.01)

(56) References Cited

U.S. PATENT DOCUMENTS

| | | | |
|---|---|---|---|
| 6,317,686 B1 * | 11/2001 | Ran | 701/533 |
| 6,480,783 B1 | 11/2002 | Myr | |
| 7,035,734 B2 | 4/2006 | Shaffer et al. | |
| 7,366,606 B2 | 4/2008 | Uyeki | |
| 7,671,764 B2 | 3/2010 | Uyeki et al. | |
| 7,778,769 B2 | 8/2010 | Boss et al. | |
| 8,712,675 B2 | 4/2014 | Grigsby | |
| 2004/0049424 A1 * | 3/2004 | Murray et al. | 705/14 |
| 2006/0058950 A1 | 3/2006 | Kato et al. | |
| 2007/0276596 A1 | 11/2007 | Solomon et al. | |
| 2007/0290839 A1 | 12/2007 | Uyeki et al. | |
| 2008/0091342 A1 * | 4/2008 | Assael | 701/202 |

OTHER PUBLICATIONS

U.S. Appl. No. 12/131,762 entitled "Preventative Traffic Congestion Social Networking Improvement System Within a Community"; Final office action dated Mar. 15, 2012.

U.S. Appl. No. 12/131,762 entitled "Preventative Traffic Congestion Social Networking Improvement System Within a Community"; Notice of Allowance Dec. 13, 2013.

U.S. Appl. No. 12/194,647 entitled "Preventative Traffic Congestion Social Networking Improvement System Within a Community"; Final office action dated Oct. 31, 2008.

* cited by examiner

PREVENTATIVE TRAFFIC CONGESTION SOCIAL NETWORKING IMPROVEMENT SYSTEM WITHIN A COMMUNITY

PRIORITY CLAIM

The present application is a continuation of U.S. patent application Ser. No. 12/131,762, filed Jun. 2, 2008 and entitled, "Preventative Traffic Congestion Social Networking Improvement System within a Community," the contents of which are incorporated herein by reference.

BACKGROUND OF THE INVENTION

1. Technical Field

The present invention relates in general to global positioning system (GPS) devices. Still more particularly, the present invention relates to transmitting optimized routes to several GPS devices, wherein the optimized routes provide travel instructions to minimize traffic congestion and driving time for a community.

2. Description of the Related Art

GPS devices have become ubiquitous for assisting persons in traveling to their intended destinations. Currently, GPS devices only consider travel routes with reference to a single user travelling to a destination along a known route based on ideal road conditions. In many situations, if every passenger of a community was to take a same route suggested by a GPS device, the road would become overly congested, lengthening the typical travel time for the entire community.

SUMMARY OF THE INVENTION

A method, system, and computer program product for transmitting traffic congestion routing data to a community of global positioning system (GPS) devices. Community routing logic of a community routing system (CRS) receives a route request containing the current location and desired destination of a GPS device. The CRS may use the community routing logic to determine a path that the user of the GPS device should travel on to best minimize driving time and traffic conditions for a community of users of the CRS. The CRS considers road capacity, current traffic conditions, and historical traffic data for roads and alternate roads along a preferred route. The CRS also considers routes previously taken by the GPS device. Additionally, the CRS may receive information about routes taken by other GPS devices to further improve future routes of the community of GPS devices.

The above features of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for a community routing system that efficiently routes a community of GPS devices towards a common destination, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
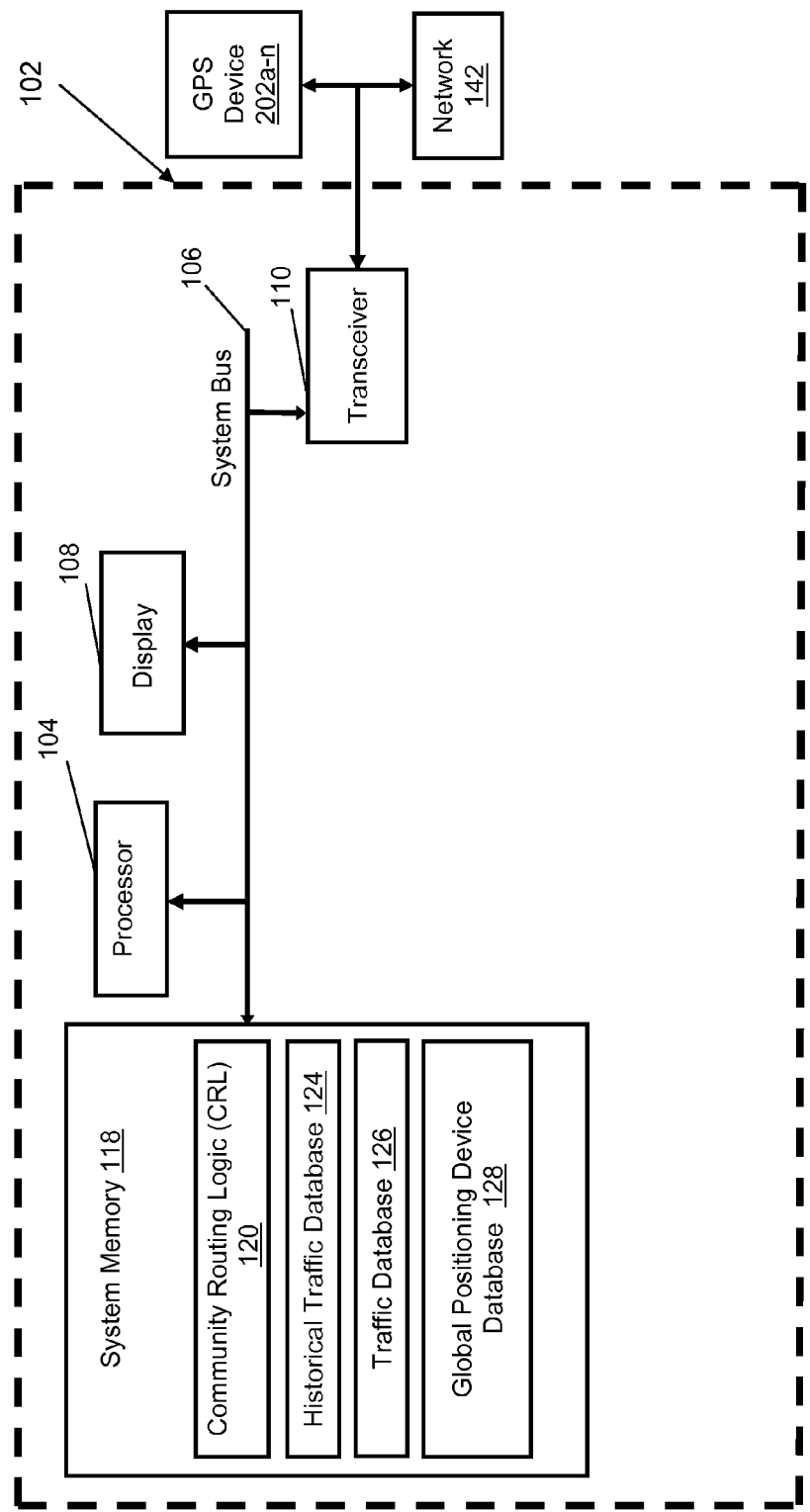
FIG. 1 is a block diagram of a community routing system in which the present invention may be implemented.

With reference now to FIG. 1, there is depicted a block diagram of an exemplary community routing system (CRS) 102 in which the present invention may be implemented. CRS 102 includes a processor 104 that is coupled to a system bus 106. A transceiver 110, connected to system bus 106, enables CRS 102 to communicate with global positioning system (GPS) devices 202*a-n* and network 142 via wired, wireless, or GPS satellite based technology. Display 108, coupled to system bus 106, allows for presentation of a general user interface (including text and graphics) for use by a user of CRS 102.

CRS 102 also comprises system memory 118, which is connected to system bus 106. System memory 118 of CRS 102 includes community routing logic (CRL) 120. CRL 120 includes logic for implementing the processes described in FIGS. 2-3.

As shown, system memory 118 also contains a historical traffic database 124, traffic database 126, and global positioning device database 128. Historical traffic database 124 contains historical traffic conditions and information for roads in a region. Traffic database 126 contains real-time data of traffic conditions of roads in a region. Global positioning device database 128 contains prior routing data (e.g., routes previously taken by a GPS device) of GPS devices. In an alternate embodiment, traffic database 126 may be accessed of network 142.

As illustrated and described herein, CRS 102 may be a computer system or server having required hardware components and programmed with CRL 120, executes on the processor to provide the functionality of the invention. In this implementation CRS 102 is coupled to a GPS system. However, CRS 102 may also be a GPS device that is specifically designed to include the functionality of CRL 120, as described herein. CRS 102 may also be a GPS satellite or a software instance that communicates with a GPS satellite. The hardware elements depicted in CRS 102 are not intended to be exhaustive, but rather are representative to highlight essential components required by and/or utilized to implement the present invention. For instance, CRS 102 may include alternate memory storage devices such as magnetic cassettes, Digital Versatile Disks (DVDs), Bernoulli cartridges, and the like. These and other variations are intended to be within the spirit and scope of the present invention.

Figure 2:
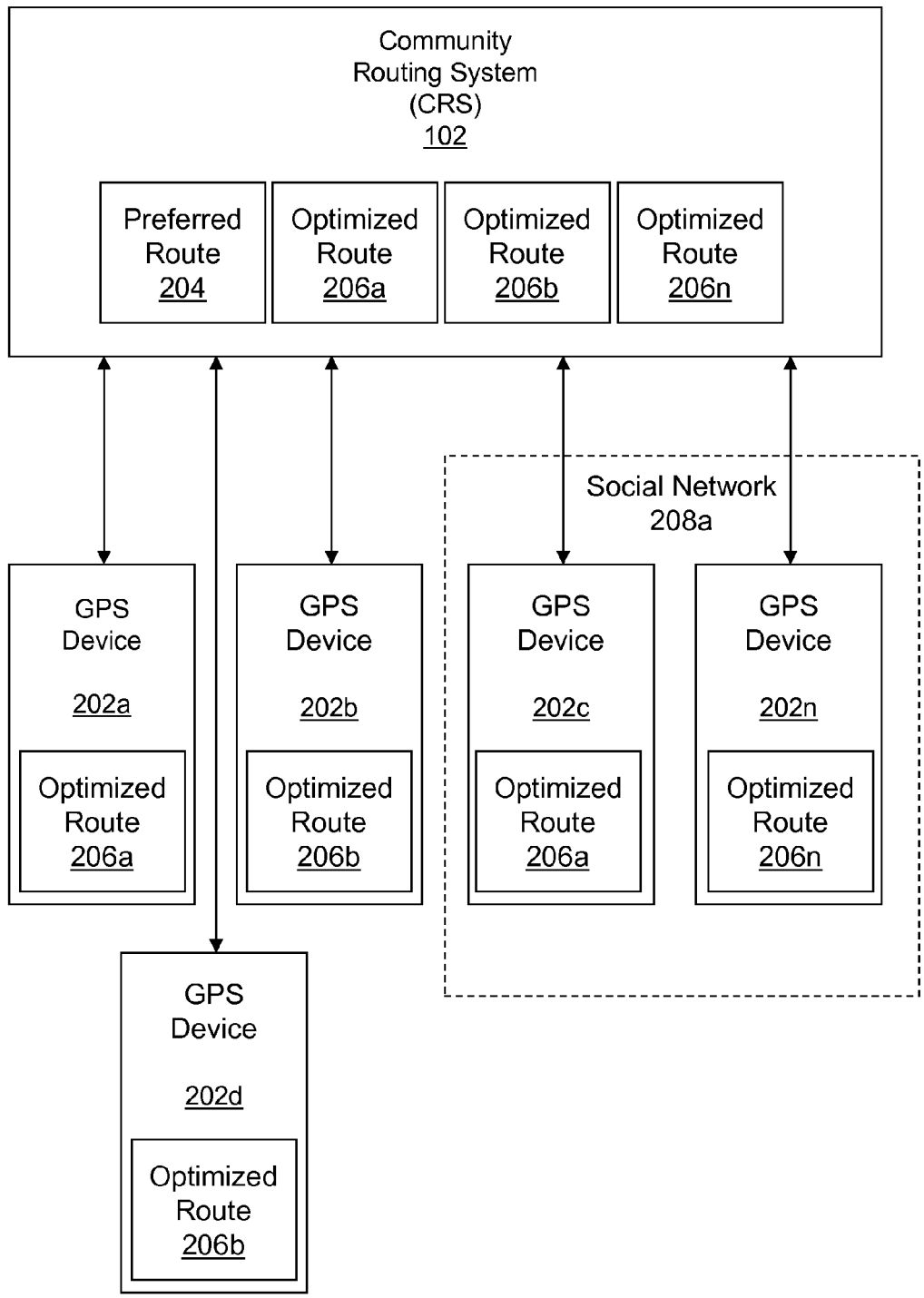
FIG. 2. is a block diagram of an exemplary system for implementing a community routing system to efficiently route a community of GPS devices, subscribed to the community routing system, towards a common destination.

Note also the architecture shown in FIG. 1 for CRS 102 may be substantially implemented in Global Positioning System (GPS) Devices 202*a-n*, more clearly illustrated in FIG. 2. Additionally, by including Transceiver 110 in the architecture of CRS 102, the appropriate elements illustrated as components of CRS 102 can communicate with GPS devices 202*a-n*.

With reference now to FIG. 2, a block diagram of an exemplary system for implementing a CRS to efficiently route a community of GPS devices, subscribed to the community routing system, towards a common destination.

A GPS device 202 of community GPS devices 202*a-n* subscribed to CRS 102 initiates a route request to travel towards a desired destination. According to the described and illustrative embodiment, a route request contains the current location of a GPS device 202*a-n*, a desired destination, and a maximum re-routing distance off of a Preferred Route 204 to the destination. Preferred Route 204 is the model route of travel between the current location and the desired destination of GPS device 202*a-n* under ideal conditions (e.g., low traffic, no construction zones, good visibility). Logic of CRS 102 (e.g., CRL 120, FIG. 1) determines the Preferred Route 204 of travel between the current location and the desired destination of GPS device 202*a-n*. The maximum re-routing distance is a maximum distance that a user of GPS device 202*a-n* desires to travel off of the preferred route 204 from the current location of GPS device 202*a-n* to the desired destination. For example, a user of GPS device 202*a* may select a maximum re-routing distance of 5 miles. When calculating an optimized route 206*a*, CRS 102 will re-route GPS device 202*a* no more than 5 miles off of Preferred Route 204.

CRS 102 may also reference historical data of roads along preferred route 204 by reading the historical data from a database (e.g., historical traffic database 120, FIG. 1). CRS 102 may receive current traffic congestion conditions from a real-time traffic database (e.g., traffic database 126). CRS 102 may reference a database of routing data of GPS devices 202*a-n* (e.g., global positioning device database 128) to determine past routes travelled by a GPS device 202*a-n*. Logic of CRS 102 may then select alternate roads off of Preferred Route 204 to calculate an Optimized Route 206*a-n* for a GPS device 202*a-n* to travel to reach the desired destination. Optimized Routes 206*a-n* serves to minimize traffic conditions for a community of vehicles for a multiple routes travelling towards a similar destination. CRS 102 may also reference historical data from a database to determine the capacity or roads along the Preferred Route 204 and alternate roads off of the Preferred Route 204. CRS 102 may also receive information from the real-time traffic database of the number of cars already travelling along the Preferred Route 204 and alternate roads off of the Preferred Route 204.

When calculating an Optimized Route 206*a-n*, CRS 102 considers current travel conditions, historical travel conditions, the number of GPS devices 202*a-n* currently traveling along Preferred Route 204 and other Optimized Routes 206*a-n* previously taken by the requesting GPS device 202*a-n*. CRS 102 selects an Optimized Route 206*a-n* to minimize traffic congestion for a community of GPS devices 202*a-n*. It is important to note that while an Optimized Route 206*a-n* calculated by CRS 102 may not be the most efficient path of travel for the requesting GPS Device 202*a-n*, an Optimized Route 206*a-n* ensures that the overall driving time and traffic conditions for a community are minimized. Alternatively, in circumstances where traffic conditions are light, CRS 102 may transmit the preferred route 204 to GPS Devices 202*a-n*. In the event traffic conditions change, CRS 102 may adjust Optimized Routes 206*a-n* to compensate for increased traffic levels. CRS 102 circumvents escalating traffic conditions by efficiently routing traffic along multiple Optimized Routes 206*a-n*.

For example, five GPS devices 202*a-e* have requested to travel towards a specific destination. Highway A is a two lane highway which is also the Preferred Route 204 to reach the destination in the shortest amount of time. Highway B is a 8 lane highway, with a slightly longer travel path to the destination. CRS 102 may calculate Optimized Route 206*a* (travel on Highway A) and Optimized Route 206*b* (travel on Highway B). To best maintain optimized traffic conditions, CRS 102 transmits Optimized Route 206*a* to a first requesting GPS device 202*a*, while Optimized Route 206*b* is transmitted to a next four requesting GPS devices 202*b-e*.

Additionally, CRS 102 may consider past Optimized Routes 206*a-n* travelled by a GPS device 202*a-n*, and select a shorter or longer route to normalize typical travel time for the community of GPS devices 202*a-n*, who may be travelling towards the same destination. For example, the user of GPS device 202*d* has traveled along a longer Optimized Route 206*b* on the way home from work Monday through Thursday of the same week. Optimized Route 206*a* is a more direct route, but has a smaller vehicle capacity. Logic of CRS 102 may recognize that the user of GPS device 202*d* has travelled the longer route the past several days, and transmit the more direct Optimized Route 206*a* to GPS device 202*d* on Friday.

CRS 102 may also receive information of routes actually travelled by GPS devices 202*a-n*. This information may be used to better calculate future Optimized Routes 206*a-n*. Alternatively, this information may be used to only send certain Optimized Routes 206*a-n* to a specific GPS devices 202*a-n*. In one embodiment, upon a GPS device 202*a-n* reaching the desired destination, CRS 102 may receive information of the routs taken by the GPS device 202*a-n*. For example, despite receiving Optimized Route 206*b* Monday through Thursday of a same work week, GPS device 102*c* travelled along Optimized Route 206*a* each day. CRS 102 may then continue to transmit the longer Optimized Route 206*b* on Friday, instead of the shorter Optimized Route 206*a*, to facilitate a better community flow of traffic.

Depending on the number of calculated Optimized Routes 206*a-n*, CRS 102 may also present a selection of more than one Optimized Route 206*a-n* to a GPS device 202*a-n*. CRS 102 may send a notice to a GPS device 202*a-n* of a selection of other GPS devices 202*b-n* in a same Social Network 208*a-n* that are travelling along an Optimized Route 206*a-n*. A social network is a group of users whose GPS devices 202*a-n* are collectively registered with CRS 102 (e.g., GPS devices 202*c-n* that are registered to coworkers at a same company). CRS 102 may transmit route or carpool suggestions to a GPS device 202 specifying other GPS devices 202*b-n* in a same social network typically travelling along a same Optimized Route 206*a-n*. A user of a GPS device 202*a-n* may use this information to determine if they wish to remain on their current route of travel, or if they would rather travel on a route of another user. Additionally, CRS 102 may interface with social networking software stored on an external network (e.g., network 142, FIG. 1) to better facilitate carpool or route recommendations amongst GPS devices 202a-n subscribed to the social networking software. CRS 102 may also interface with a database of a social network to gather event data and or to share carpool opportunities with other users within the social network on the same or a similar route. In an alternate embodiment, CRS 102 may also retrieve information from a calendar component of the social network regarding schedules of other users. A user may use this information to decide if they can assist the social network community by taking a longer route on a less busy day, in hopes that on busier days other users would do the same. CRS 102 may transmit an Optimized Route 206a-n taken by one GPS device 202a-n to another GPS device 202a-n, to provide information between users on similar routes. Information shared between GPS devices 202a-n by CRS 102 may also contain identification information (e.g., full name, department title) of the GPS devices 202a-n to identify the user of one GPS device 202a-n to the user of another GPS device 202a-n.

Figure 3:
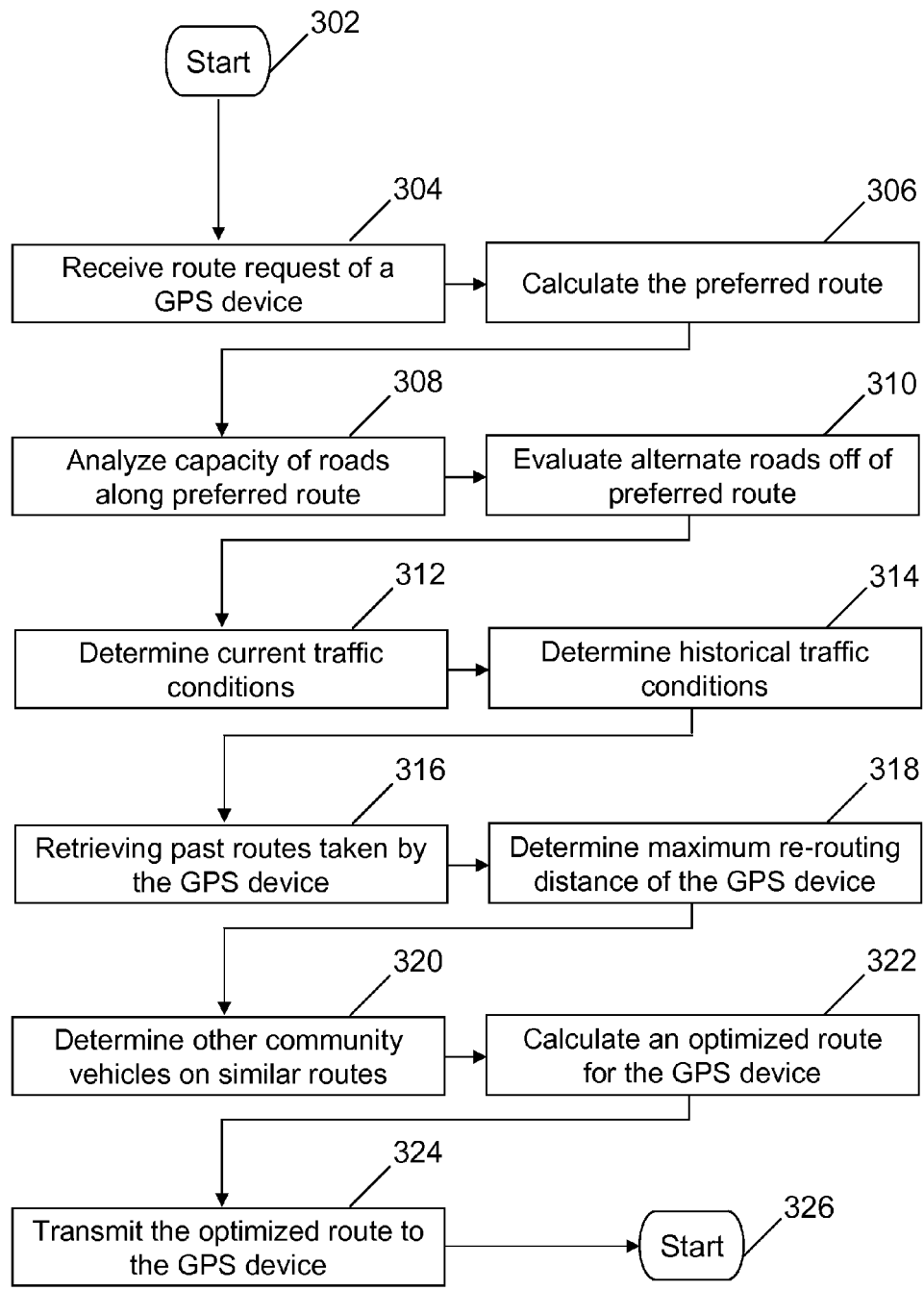
FIG. 3. is a high-level logical flowchart of an exemplary method for using a community routing system to efficiently route a community of GPS devices to one or more destinations.

With reference now to FIG. 3, a high-level logical flowchart of an exemplary method for using a community routing system to efficiently route a community of GPS devices to one or more destinations, is presented. After initiator block 302, the community routing system (CRS) receives a route request containing the current location, desired destination, and maximum desired re-routing distance of a global positioning system (GPS) device (block 304).

CRS calculates a preferred route of travel (block 306). CRS may then analyze the capacity of roads along the preferred route (block 308), and evaluate alternate roads off of the preferred route (block 310). CRS determines the current traffic conditions of (a) roads along the preferred route and (b) the alternate roads off of the preferred route (block 312). CRS references historical traffic conditions to determine typical traffic and congestion along the preferred route, and along the alternate roads off of the preferred route perhaps based on time of day or other variables (block 314). CRS retrieves data of past routes taken by the requesting GPS device (block 316), and determines the maximum re-routing distance of the requesting GPS device transmitted in the route request (block 318). CRS determines other vehicles in the same community of the requesting GPS device that are travelling along similar routes (block 320).

Using the information gathered in blocks 304 thru block 320, CRS calculates an optimized route of travel for the requesting GPS device (block 322). CRS then transmits the optimized route to the GPS device and tracks the actual route taken by the requesting GPS device for storage in a historical database (block 324). The process ends at terminator block 326.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for optimizing travel time for a community of GPS devices, the method comprising:
    transmitting, to a particular GPS device, a selection of one or more alternate routes in use by one or more GPS devices of a subset of GPS devices within a community of GPS devices, wherein the subset of GPS devices and the particular GPS device are part of a same social network, wherein a social network is a group of users associated with a corresponding group of GPS devices that are collectively registered with the community routing system, and wherein each GPS device in the community is associated with a vehicle;
    providing a selection to the particular GPS device of a currently selected route and the one or more alternate routes in use by the other devices in the subset of GPS devices; and
    receiving a selection of an alternate optimized route from the one or more alternate routes in use by the subset of GPS devices.

2. The method of claim 1, further comprising:
    identifying a preferred route for directing the one or more vehicles in the community to the desired destination;
    evaluating alternate roads that can be taken off the preferred route to reach the desired destination;
    receiving a current traffic congestion information from a traffic congestion information provider; and determining one or more locations where traffic levels along the preferred route exceed normal levels along the preferred route at the current time.

3. The method of claim 1, further comprising:
receiving a route request from one or more GPS devices within the community of GPS devices, wherein the route request contains: a current location of the GPS device; a desired destination of the GPS device; and a maximum re-routing distance permitted from a typical route while traveling to the desired destination; and
determining one or more vehicles in the community traveling along the preferred route.

4. The method of claim 1, further comprising:
creating at least two optimized routes to reach a desired destination, wherein the at least two optimized routes provides routing instructions to minimize driving time for the community of GPS devices;
transmitting a first optimized route to reach the desired destination to a second subset of GPS devices within the community of GPS devices; and
transmitting a second optimized route to reach the desired destination to a third subset of GPS devices within the community of GPS devices.

5. The method of claim 4, further comprising:
receiving updated traffic congestion information;
determining whether the traffic congestion information has substantially changed;
in response to determining the current traffic congestion information has substantially changed, modifying the at least two optimized routes to minimize the overall driving time for the community of GPS devices;
transmitting the modified first optimized route to the second subset of GPS devices; and
transmitting the modified second optimized route to the third subset of GPS devices.

6. The method of claim 1, further comprising:
retrieving, from a calendar component of a same social network, schedule information of other users of the same social network; and
transmitting, to the particular GPS device, one or more carpool suggestions, wherein the carpool suggestions identify one or more other GPS devices within the same social network typically travelling along a same optimized route to reach the desired destination.

7. The method of claim 1, further comprising transmitting identification information of a user of each alternate route to the particular GPS device, wherein the identification information contains a name of the user of each alternate route.

8. The method of claim 1, further comprising:
identifying one or more past optimized routes travelled by the particular GPS device;
selecting one of a longer route for the particular GPS device and a shorter route for the particular GPS device, wherein the selected one of the longer route and the shorter route normalizes typical travel time for the community of GPS devices; and
transmitting the selected one of the longer route and the shorter route to the particular GPS device.

9. A community routing system comprising:
a processor;
a memory coupled to the processor;
a transceiver to connect and exchange information with a community of global positioning system (GPS) devices; and
a processing logic executing on the processor configured to:
transmit, to a particular GPS device, a selection of one or more alternate routes in use by one or more GPS devices of a subset of GPS devices within the community of GPS devices, wherein the subset of GPS devices and the particular GPS device are part of a same social network, wherein a social network is a group of users associated with a corresponding group of GPS devices that are collectively registered with the community routing system, and wherein each GPS device in the community is associated with a vehicle;
provide a selection to the particular GPS device of a currently selected route and the one or more alternate routes in use by the subset of GPS devices; and
receive a selection of an alternate optimized route from the one or more alternate routes in use by the subset of GPS devices.

10. The community routing system of claim 9, the processing logic further configured to:
identify a preferred route for directing the one or more vehicles in the community to the desired destination;
evaluate alternate roads that can be taken off the preferred route to reach the desired destination;
receive a current traffic congestion information from a traffic congestion information provider;
determine one or more locations where traffic levels along the preferred route exceed normal levels along the preferred route at the current time; and
in response to the GPS device reaching the desired destination, receive information of an actual route taken by the GPS device.

11. The community routing system of claim 9, the processing logic further configured to:
create at least two optimized routes to reach a desired destination, wherein the at least two optimized routes provides routing instructions to minimize driving time for the community of GPS devices;
transmit a first optimized route to reach the desired destination to a second subset of GPS devices within the community of GPS devices; and
transmit a second optimized route to reach the desired destination to a third subset of GPS devices within the community of GPS devices.

12. The community routing system of claim 9, the processing logic further configured to:
receive updated traffic congestion information;
determine whether the traffic congestion information has substantially changed;
in response to determining the current traffic congestion information has substantially changed, modify the at least two optimized routes to minimize the overall driving time for the community of GPS devices;
transmit the modified first optimized route to the second subset of GPS devices; and
transmit the modified second optimized route to the third subset of GPS devices.

13. The community routing system of claim 9, the processing logic further configured to:
receive a route request from one or more GPS devices within the community of GPS devices, wherein the route request contains: a current location of the GPS device; the desired destination of the GPS device; and a maximum re-routing distance permitted from a typical route while traveling to the desired destination; and determine one or more vehicles in the community traveling along the preferred route;
interface with a database of the same social network to facilitate improved carpool and route recommendations amongst GPS devices subscribed to the same social network, wherein the database of the same social network is stored on an external network separate from the community routing system;
retrieve, from a calendar component of the same social network, schedule information of other users of the same social network;
transmit, to the particular GPS device, one or more carpool suggestions, wherein the carpool suggestions identify one or more other GPS devices within the same social network typically travelling along a same optimized route to reach the desired destination; and
transmit identification information of a user of each alternate route to the particular GPS device, wherein the identification information contains a name of the user of each alternate route.

14. The community routing system of claim 9, the processing logic further configured to:
identify one or more past optimized routes travelled by the particular GPS device;
select one of a longer route for the particular GPS device and a shorter route for the particular GPS device, wherein the selected one of the longer route and the shorted route normalizes typical travel time for the community of GPS devices; and
transmit the selected one of the longer route and the shorter route to the particular GPS device.

15. A method for optimizing travel time for a community of GPS devices, the method comprising:
retrieving, from a calendar component of a same social network, schedule information of other users of the same social network, wherein the same social network facilitates improved carpool and route recommendations amongst GPS devices subscribed to the same social network, and a database of the same social network is stored on an external network separate from the community routing system;
transmitting, to the particular GPS device, one or more carpool suggestions, wherein the carpool suggestions identify one or more other GPS devices within the same social network typically travelling along a same optimized route to reach the desired destination;
analyzing a vehicle capacity for each of the roads along the preferred route; and
retrieving one or more similar routes previously taken by the GPS device.

16. The method of claim 15, further comprising:
creating at least two optimized routes to reach a desired destination, wherein the at least two optimized routes provides routing instructions to minimize driving time for the community of GPS devices;
transmitting a first optimized route to reach the desired destination to a first subset of GPS devices within the community of GPS devices; and
transmitting a second optimized route to reach the desired destination to a second subset of GPS devices within the community of GPS devices.

17. The method of claim 15, further comprising:
transmitting, to a particular GPS device, a selection of one or more alternate routes in use by one or more GPS devices of a third subset of GPS devices within the community of GPS devices, wherein the third subset of GPS devices and the particular GPS device are part of a same social network, wherein a social network is a group of users associated with a corresponding group of GPS devices that are collectively registered with the community routing system;
transmitting identification information of a user of each alternate route to the particular GPS device, wherein the identification information contains a name of the user of each alternate route;
providing a selection to the particular GPS device of a currently selected route and the one or more alternate routes in use by the third subset of GPS devices; and
receiving a selection of an alternate optimized route from the one or more alternate routes in use by the third subset of GPS devices;
wherein each GPS device in the community is associated with a vehicle.

18. The method of claim 15, further comprising:
receiving a route request from one or more GPS devices within the community of GPS devices, wherein the route request contains: a current location of the GPS device; a desired destination of the GPS device; and a maximum re-routing distance permitted from a typical route while traveling to the desired destination;
identifying a preferred route for directing the one or more vehicles in the community to the desired destination;
determining one or more vehicles in the community traveling along the preferred route;
evaluating alternate roads that can be taken off the preferred route to reach the desired destination;
receiving a current traffic congestion information from a traffic congestion information provider;
determining one or more locations where traffic levels along the preferred route exceed normal levels along the preferred route at the current time;
in response to the GPS device reaching the desired destination, receiving information of an actual route taken by the GPS device;
receiving updated traffic congestion information;
determining whether the traffic congestion information has substantially changed;
in response to determining the current traffic congestion information has substantially changed, modifying the at least two optimized routes to minimize the overall driving time for the community of GPS devices;
transmitting the modified first optimized route to the first subset of GPS devices; and
transmitting the modified second optimized route to the second subset of GPS devices.

19. The method of claim 15, further comprising:
identifying one or more past optimized routes travelled by the particular GPS device;
in response to identifying the one or more past optimized routes travelled by the particular GPS device, selecting one of a longer route for the particular GPS device and a shorter route for the particular GPS device, wherein the selected one of the longer route and the shorted route normalizes typical travel time for the community of GPS devices; and
transmitting the selected one of the longer route and the shorter route to the particular GPS device.

* * * * *